(12) United States Patent
Yamada et al.

(10) Patent No.: US 12,325,976 B2
(45) Date of Patent: Jun. 10, 2025

(54) CONTROL DEVICE AND CONTROL METHOD FOR CONTROLLING OUTPUT OF DRIVE SOURCE OF WORK VEHICLE

(71) Applicant: KOMATSU LTD., Tokyo (JP)

(72) Inventors: Kenichi Yamada, Tokyo (JP); Shogo Miyazaki, Tokyo (JP)

(73) Assignee: KOMATSU LTD., Tokyo (JP)

( * ) Notice: Subject to any disclaimer, the term of this patent is extended or adjusted under 35 U.S.C. 154(b) by 319 days.

(21) Appl. No.: 17/283,039

(22) PCT Filed: Nov. 12, 2019

(86) PCT No.: PCT/JP2019/044354
§ 371 (c)(1),
(2) Date: Apr. 6, 2021

(87) PCT Pub. No.: WO2020/105512
PCT Pub. Date: May 28, 2020

(65) Prior Publication Data
US 2021/0348363 A1 Nov. 11, 2021

(30) Foreign Application Priority Data
Nov. 19, 2018 (JP) .................................. 2018-216735

(51) Int. Cl.
*E02F 9/20* (2006.01)
(52) U.S. Cl.
CPC .......... *E02F 9/2066* (2013.01); *E02F 9/2029* (2013.01); *E02F 9/2033* (2013.01); *E02F 9/2079* (2013.01); *E02F 9/2083* (2013.01)
(58) Field of Classification Search
USPC ........................................................ 701/50
See application file for complete search history.

(56) References Cited

U.S. PATENT DOCUMENTS

| 6,330,504 B1 | 12/2001 | Toukura et al. |
| 2006/0276948 A1* | 12/2006 | Toda .................... F16D 15/00 |
| | | 701/50 |

(Continued)

FOREIGN PATENT DOCUMENTS

| EP | 1 045 121 A2 | 10/2000 |
| EP | 1 132 657 A2 | 9/2001 |

(Continued)

OTHER PUBLICATIONS

The International Search Report for the corresponding international application No. PCT/JP2019/044354, issued on Feb. 4, 2020.

*Primary Examiner* — James M McPherson
*Assistant Examiner* — Sean Patrick Reidy
(74) *Attorney, Agent, or Firm* — Global IP Counselors, LLP (57) ABSTRACT

A control device of a work vehicle includes a required output torque determination unit that determines a required output torque of the power transmission device based on an operation amount of the operation device and a traveling speed of the work vehicle, a traveling load estimation unit that estimates a traveling load torque related to a traveling load on the work vehicle, a required output torque correction unit that corrects the required output torque such that the required output torque is included in an allowable output torque range including an estimated traveling load torque, and a drive source control unit that outputs a control signal for the drive source based on a corrected required output torque.

10 Claims, 5 Drawing Sheets

(56) References Cited

U.S. PATENT DOCUMENTS

| | | |
|---|---|---|
| 2009/0143192 A1 | 6/2009 | Fuchs et al. |
| 2012/0004797 A1 | 1/2012 | Baino et al. |
| 2012/0022735 A1* | 1/2012 | Tashiro ................ B60L 7/18 |
| | | 701/22 |
| 2012/0221219 A1* | 8/2012 | Murata ................ F16H 61/14 |
| | | 192/3.29 |
| 2013/0041561 A1* | 2/2013 | Asami ................ E02F 9/225 |
| | | 701/50 |
| 2013/0297160 A1* | 11/2013 | Kar ................ B60W 30/18072 |
| | | 701/54 |
| 2013/0317684 A1 | 11/2013 | Kaneko et al. |
| 2015/0006010 A1 | 1/2015 | Ito |
| 2015/0204053 A1* | 7/2015 | Imaizumi ........... F02D 41/0085 |
| | | 701/50 |
| 2015/0315767 A1 | 11/2015 | Miyamoto et al. |
| 2016/0208458 A1* | 7/2016 | Juricak ................ B60W 10/06 |
| 2017/0044736 A1 | 2/2017 | Miyamoto et al. |
| 2018/0234030 A1* | 8/2018 | Kamiko ............. H02M 7/5395 |

FOREIGN PATENT DOCUMENTS

| | | |
|---|---|---|
| EP | 3 072 768 A2 | 9/2016 |
| EP | 3 093 400 A1 | 11/2016 |
| JP | 2005-280559 A | 10/2005 |
| JP | 4272094 B2 | 3/2009 |
| JP | 2011-245948 A | 12/2011 |
| JP | 2013-166482 A | 8/2013 |
| WO | 2008/041892 A1 | 4/2008 |
| WO | 2012/114782 A1 | 8/2012 |
| WO | 2014/208614 A1 | 12/2014 |

\* cited by examiner

CONTROL DEVICE AND CONTROL METHOD FOR CONTROLLING OUTPUT OF DRIVE SOURCE OF WORK VEHICLE

CROSS REFERENCE TO RELATED APPLICATION(S)

This application is a U.S. National stage application of International Application No. PCT/JP2019/044354, filed on Nov. 12, 2019. This U.S. National stage application claims priority under 35 U.S.C. § 119(a) to Japanese Patent Application No. 2018-216735, filed in Japan on Nov. 19, 2018, the entire contents of which are hereby incorporated herein by reference.

BACKGROUND

Filed of the Invention

The present invention relates to a work vehicle, and a control device and a control method for the work vehicle.

Background Information

There is a work vehicle such as a wheel loader having a continuously variable transmission mounted therein. Examples of the continuously variable transmission include a hydraulic static transmission (HST) and a hydraulic mechanical transmission (HMT). PCT International Publication No. WO2014/208614 discloses a technique in which, in a work vehicle having a continuously variable transmission mounted therein, a command for an engine is determined such that an output torque in accordance with an operator's intention is obtained based on an accelerator operation.

SUMMARY

A work vehicle is designed such that a high torque can be applied to a traveling device assuming not only travel on a paved road but also travel on a rough road or a steep slope, and further assuming work such as excavation, dozing, and towing. Thus, in a case where an output torque is obtained based on an accelerator operation as in PCT International Publication No. WO2014/208614, when an operator depresses the accelerator strongly, contrary to the intention of the operator, an unnecessarily strong acceleration may be generated in travel of the work vehicle, and thus riding comfort may deteriorate. On the other hand, when an output torque is restricted at all times such that a strong acceleration is not generated, there are trade-off events such as a decrease in vehicle speed due to an insufficient torque on a rough road.

An object of the present invention is to provide a work vehicle, and a control device and a control method for the work vehicle, capable of controlling traveling of the work vehicle such that an excessive acceleration is not generated while an output torque is applied to the work vehicle as intended by an operator.

According to a first aspect of the present invention, there is provided a control device of a work vehicle, the work vehicle including a drive source, a traveling device that is driven by a drive force of the drive source, a power transmission device of which an input shaft is connected to the drive source and an output shaft is connected to the traveling device, the power transmission device transmitting the drive force which is input to the input shaft to the output shaft, and an operation device that is used to give an instruction for a magnitude of the drive force of the drive source, the control device including a required output torque determination unit that determines a required output torque of the power transmission device based on an operation amount of the operation device and a traveling speed of the work vehicle; a traveling load estimation unit that estimates a traveling load torque related to a traveling load on the work vehicle based on a torque of the drive source, a rotation speed ratio of the power transmission device, and a rotation speed of the output shaft; a required output torque correction unit that corrects the required output torque such that the required output torque is included in an allowable output torque range including an estimated traveling load torque; and a drive source control unit that outputs a control signal for the drive source based on a corrected required output torque.

According to at least one aspect among the aspects, the control device of the work vehicle can control traveling of the work vehicle such that an excessive acceleration is not generated.

DETAILED DESCRIPTION OF EMBODIMENT(S)

First Embodiment

Hereinafter, embodiments will be described in detail with reference to the drawings.

Figure 1:
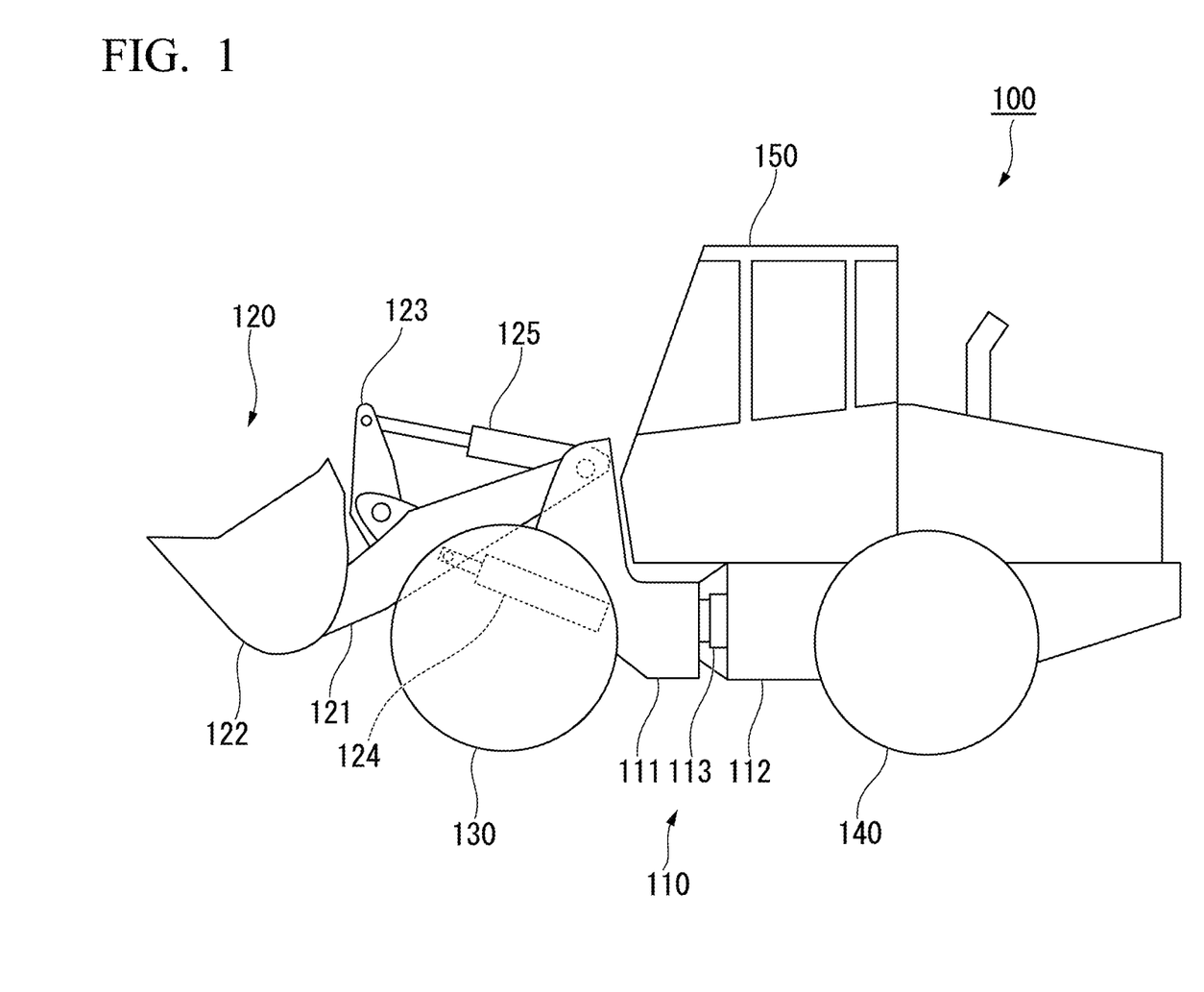
FIG. 1 is a side view illustrating a work vehicle according to a first embodiment.

FIG. 1 is a side view illustrating a work vehicle according to a first embodiment.

A work vehicle 100 according to the first embodiment is a wheel loader. The work vehicle 100 includes a vehicle body 110, work equipment 120, a front wheel portion 130, a rear wheel portion 140, and a cab 150.

The vehicle body 110 includes a front vehicle body 111, a rear vehicle body 112, and a steering cylinder 113. The front vehicle body 111 and the rear vehicle body 112 are attached to be rotationally moved around a steering shaft that extends in a vertical direction of the vehicle body 110. The front wheel portion 130 is provided under the front vehicle body 111, and the rear wheel portion 140 is provided under the rear vehicle body 112.

The steering cylinder 113 is a hydraulic cylinder. A basal end of the steering cylinder 113 is attached to the rear vehicle body 112, and a distal end of the steering cylinder 113 is attached to the front vehicle body 111. The steering cylinder 113 is expanded and contracted by a hydraulic oil to define an angle formed between the front vehicle body 111 and the rear vehicle body 112. In other words, a steering angle of the front wheel portion 130 is defined by expansion and contraction of the steering cylinder 113.

The work equipment 120 is used to excavate and convey a work target object such as earth and sand. The work equipment 120 is provided at a front part of the vehicle body 110. The work equipment 120 includes a boom 121, a bucket 122, a bell crank 123, a lift cylinder 124, and a bucket cylinder 125.

A basal end of the boom 121 is attached to the front part of the front vehicle body 111 via a pin.

The bucket 122 includes teeth for excavating a work target object and a container for conveying the excavated work target object. A basal end of the bucket 122 is attached to a distal end of the boom 121 via a pin.

The bell crank 123 transmits power of the bucket cylinder 125 to the bucket 122. A first end of the bell crank 123 is attached to a bottom part of the bucket 122 via a link mechanism. A second end of the bell crank 123 is attached to the distal end of the bucket cylinder 125 via a pin.

The lift cylinder 124 is a hydraulic cylinder. A basal end of the lift cylinder 124 is attached to the front part of the front vehicle body 111. A distal end of the lift cylinder 124 is attached to the boom 121. The lift cylinder 124 is expanded and contracted by the hydraulic oil, and thus the boom 121 is driven in a raising direction or a lowering direction.

The bucket cylinder 125 is a hydraulic cylinder. A basal end of the bucket cylinder 125 is attached to the front part of the front vehicle body 111. A distal end of the bucket cylinder 125 is attached to the bucket 122 via the bell crank 123. The bucket cylinder 125 is expanded and contracted by the hydraulic oil, and thus the bucket 122 is swung in a tilt direction or a dump direction.

The cab 150 is a space in which an operator rides and performs an operation of the work vehicle 100. The cab 150 is provided above the rear vehicle body 112.

Figure 2:
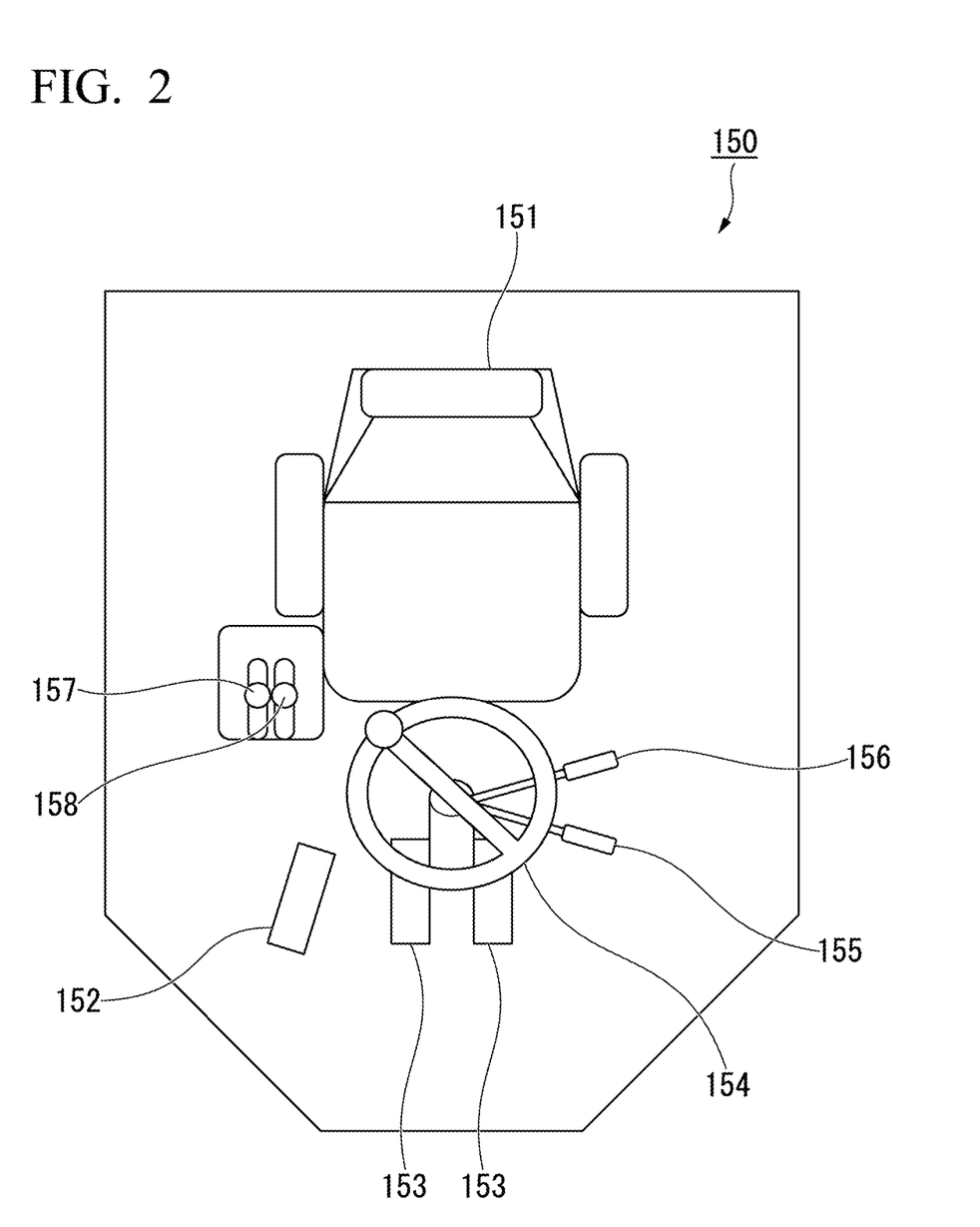
FIG. 2 is a diagram illustrating an internal configuration of a cab according to the first embodiment.

FIG. 2 is a diagram illustrating an internal configuration of the cab according to the first embodiment. The inside of the cab 150 is provided with a seat 151, an accelerator pedal 152, a brake pedal 153, a steering wheel 154, a front-rear switching switch 155, a shift switch 156, a boom lever 157, and a bucket lever 158.

The accelerator pedal 152 is operated to set a drive force (towing force) for traveling of the work vehicle 100. As an operation amount of the accelerator pedal 152 becomes larger, a target drive force (target towing force) is set to become higher.

The brake pedal 153 is operated to set a braking force for traveling of the work vehicle 100. As an operation amount of the brake pedal 153 becomes larger, a braking force is set to become higher.

The steering wheel 154 is operated to set a steering angle of the work vehicle 100.

The front-rear switching switch 155 is operated to set an advancing direction of the work vehicle 100. The advancing direction of the work vehicle is any of forward (F), rear (R), or neutral (N).

The shift switch 156 is operated to set a speed range of a power transmission device. The shift switch 156 is operated, for example, to select one speed range from among first gear, second gear, third gear, and fourth gear.

The boom lever 157 is operated to set a movement amount in a raising operation or a lowering operation of the boom 121. The boom lever 157 is tilted forward to accept the lowering operation of the boom 121, and is tilted backward to accept the raising operation of the boom 121.

The bucket lever 158 is operated to set a movement amount in a dump operation or a tilt operation of the bucket 122. The bucket lever 158 is tilted forward to accept the dump operation of the bucket 122, and is tilted backward to accept the tilt operation of the bucket 122.

(Power System)

Figure 3:
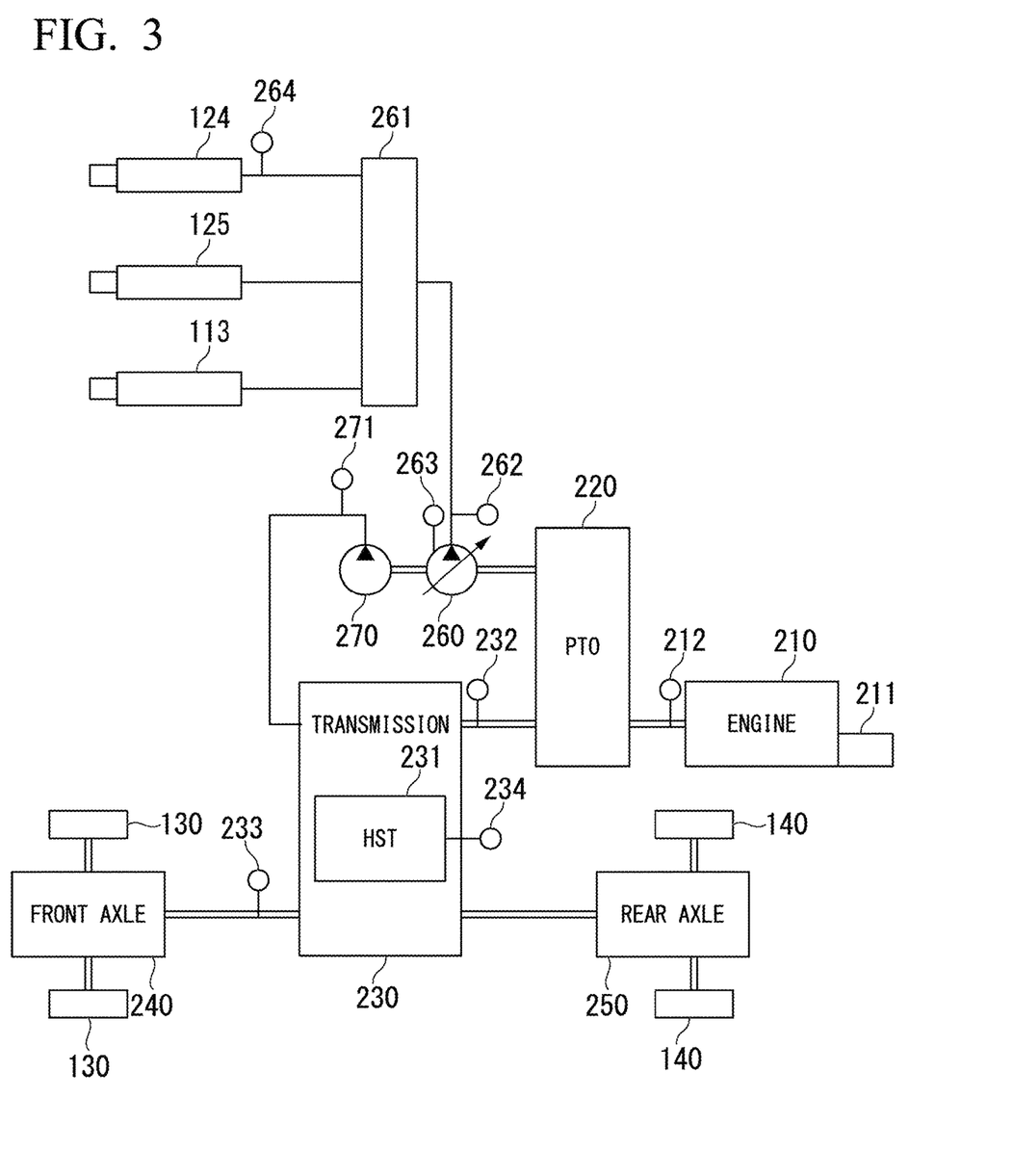
FIG. 3 is a schematic diagram illustrating a power system of the work vehicle according to the first embodiment.

FIG. 3 is a schematic diagram illustrating a power system of the work vehicle according to the first embodiment.

The work vehicle 100 includes an engine 210, a power take off (PTO) 220, a transmission 230, a front axle 240, a rear axle 250, a variable displacement pump 260, and a fixed displacement pump 270.

The engine 210 is, for example, a diesel engine. The engine 210 is provided with a fuel injection device 211 and an engine tachometer 212. The fuel injection device 211 adjusts an amount of a fuel injected into cylinders of the engine 210 to control a drive force of the engine 210. The engine tachometer 212 measures a rotation speed of the engine 210.

The PTO 220 transmits a part of the drive force of the engine 210 to the variable displacement pump 260 and the fixed displacement pump 270. In other words, the PTO 220 distributes the drive force of the engine 210 to the transmission 230, the variable displacement pump 260, and the fixed displacement pump 270.

The transmission 230 is a continuously variable transmission including a hydrostatic continuously variable transmission (HST) 231. The transmission 230 may be a transmission that performs shift control only with the HST 231 and may be a hydraulic mechanical continuously variable transmission (HMT) that performs shift control with a combination of the HST 231 and a planetary gear mechanism. The transmission 230 shifts a drive force that is input to an input shaft and outputs the drive force from an output shaft. The input shaft of the transmission 230 is connected to the PTO 220, and the output shaft of the transmission 230 is connected to the front axle 240 and the rear axle 250. In other words, the transmission 230 transmits the drive force of the engine 210 distributed by the PTO 220 to the front axle 240 and the rear axle 250. The transmission 230 is provided with an input shaft tachometer 232 and an output shaft tachometer 233. The input shaft tachometer 232 measures a rotation speed of the input shaft of the transmission 230. The output shaft tachometer 233 measures a rotation speed of the output shaft of the transmission 230. The HST 231 of the transmission 230 is provided with an HST pressure gauge 234. The HST pressure gauge 234 measures a pressure of the HST 231.

The front axle 240 transmits the drive force output from the transmission 230 to the front wheel portion 130. Consequently, the front wheel portion 130 is rotated.

The rear axle 250 transmits the drive force output from the transmission 230 to the rear wheel portion 140. Consequently, the rear wheel portion 140 is rotated.

The front axle 240 and the rear axle 250 are examples of traveling devices.

The variable displacement pump 260 is driven by the drive force from the engine 210. A discharge capacity of the variable displacement pump 260 is changed by controlling, for example, a tilt angle of a swash plate provided in the variable displacement pump 260. A hydraulic oil discharged from the variable displacement pump 260 is supplied, via a control valve 261, to the steering cylinder 113, the lift cylinder 124, and the bucket cylinder 125. In other words, the control valve 261 controls a flow rate of the hydraulic oil discharged from the variable displacement pump 260, and thus distributes the hydraulic oil to the steering cylinder 113, the lift cylinder 124, and the bucket cylinder 125. The variable displacement pump 260 is provided with a first pump pressure gauge 262 and a pump capacity meter 263.

The first pump pressure gauge 262 measures a discharge pressure of the hydraulic oil from the variable displacement pump 260. The pump capacity meter 263 measures a capacity of the variable displacement pump 260 based on a swash plate angle or the like of the variable displacement pump 260.

The lift cylinder 124 is provided with a cylinder pressure gauge 264. The cylinder pressure gauge 264 measures a pressure of the lift cylinder 124. The variable displacement pump 260 is an example of a device to which the power is distributed by the PTO 220. In other embodiments, the variable displacement pump 260 may be configured with a plurality of pumps, and another supply destination such as a hydraulic drive fan (not illustrated) may be provided instead of or in addition to the variable displacement pump 260.

The fixed displacement pump 270 is driven by the drive force from the engine 210. A hydraulic oil discharged from the fixed displacement pump 270 is supplied to a clutch (not illustrated) in the transmission 230. The fixed displacement pump 270 is provided with a second pump pressure gauge 271. The second pump pressure gauge 271 measures a discharge pressure of the hydraulic oil from the fixed displacement pump 270. The fixed displacement pump 270 is an example of a device to which the power from the PTO 220 is distributed. The fixed displacement pump 270 may be configured with a plurality of pumps, and a supply destination such as a lubrication circuit (not illustrated) may be provided.

(Control Device)

The work vehicle 100 includes a control device 300 used to control the work vehicle 100.

The control device 300 outputs control signals to the fuel injection device 211, the transmission 230, the variable displacement pump 260, and the control valve 261 in accordance with operation amounts of the respective operation devices (the accelerator pedal 152, the brake pedal 153, the steering wheel 154, the front-rear switching switch 155, the shift switch 156, the boom lever 157, and the bucket lever 158) in the cab 150.

Figure 4:
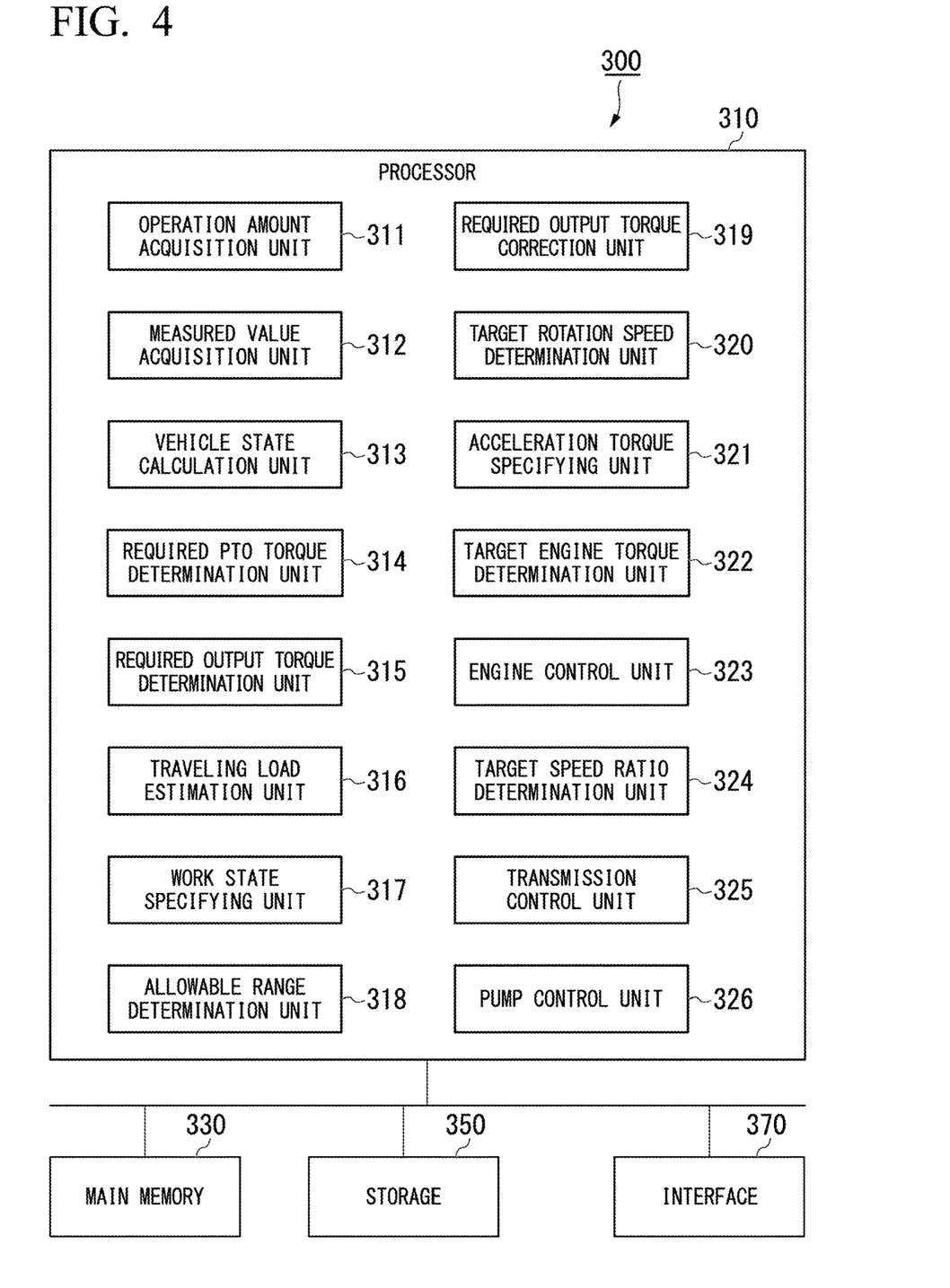
FIG. 4 is a schematic block diagram illustrating a configuration of a control device of the work vehicle according to the first embodiment.

FIG. 4 is a schematic block diagram illustrating a configuration of the control device of the work vehicle according to the first embodiment. The control device 300 is a computer including a processor 310, a main memory 330, a storage 350, and an interface 370.

The storage 350 is a non-transitory storage medium. Examples of the storage 350 include a hard disk drive (HDD), a solid state drive (SSD), a magnetic disk, a magnetooptical disc, a compact disc read only memory (CD-ROM), a digital versatile disc read only memory (DVD-ROM), and a semiconductor memory. The storage 350 may be an internal medium that is directly connected to a bus of the control device 300, and may be an external medium that is connected to the control device 300 via the interface 370 or a communication line. The storage 350 stores a program for controlling the work vehicle 100.

The program may realize some functions of the control device 300. For example, the program may realize the functions through a combination with another program already stored in the storage or a combination with another program installed in another device. In other embodiments, the computer may include a custom large scale integrated circuit (LSI) such as a programmable logic device in addition to or instead of the above configuration. Examples of the PLD include a programmable array logic (PAL), a generic array logic (GAL), a complex programmable logic device (CPLD), and a field programmable gate array (FPGA). In this case, some or all of the functions realized by the processor may be realized by the integrated circuit.

In a case where the program is delivered to the control device 300 via a communication line, the control device 300 receiving the delivered program may load the program to the main memory 330 and execute the above process.

The program may realize some of the above-described functions. The program may be a so-called difference file (difference program) that realizes the above-described functions through a combination with another program already stored in the storage 350.

The processor 310 executes the program to include an operation amount acquisition unit 311, a measured value acquisition unit 312, a vehicle state calculation unit 313, a required PTO torque determination unit 314, a required output torque determination unit 315, a traveling load estimation unit 316, a work state specifying unit 317, an allowable range determination unit 318, a required output torque correction unit 319, a target rotation speed determination unit 320, an acceleration torque specifying unit 321, a target engine torque determination unit 322, an engine control unit 323, a target speed ratio determination unit 324, a transmission control unit 325, and a pump control unit 326.

The operation amount acquisition unit 311 acquires an operation amount from each of the accelerator pedal 152, the brake pedal 153, the steering wheel 154, the front-rear switching switch 155, the shift switch 156, the boom lever 157, and the bucket lever 158. Hereinafter, an operation amount of the accelerator pedal 152 will be referred to as an accelerator operation amount, an operation amount of the brake pedal 153 will be referred to as a brake operation amount, an operation amount of the steering wheel 154 will be referred to as a steering operation amount, a value corresponding to an operation position of the front-rear switching switch 155 will be referred to as an FNR operation amount, a value corresponding to an operation position of the shift switch 156 will be referred to as a shift operation amount, an operation amount of the boom lever 157 will be referred to as a boom operation amount, and an operation amount of the bucket lever 158 will be referred to as a bucket operation amount.

The measured value acquisition unit 312 acquires measured values from the fuel injection device 211, the engine tachometer 212, the input shaft tachometer 232, the output shaft tachometer 233, the HST pressure gauge 234, the first pump pressure gauge 262, the pump capacity meter 263, the cylinder pressure gauge 264, and the second pump pressure gauge 271. In other words, the measured value acquisition unit 312 acquires a measured value of each of a fuel injection amount of the engine 210, a rotation speed of the engine 210, a rotation speed of the input shaft of the transmission 230, a rotation speed of the output shaft of the transmission 230, a pressure of the HST 231, a pump pressure of the variable displacement pump 260, a capacity of the variable displacement pump 260, a pressure of the lift cylinder 124, and a pump pressure of the fixed displacement pump 270.

The vehicle state calculation unit 313 calculates an output torque of the engine 210, an upper limit torque of the engine 210, an angular acceleration of the engine 210, a torque (PTO torque) distributed to the variable displacement pump 260 and the fixed displacement pump 270 by the PTO 220, an input-output speed ratio of the transmission 230, an angular acceleration of the output shaft of the transmission 230, and a traveling speed of the work vehicle 100 based on the measured values acquired by the measured value acquisition unit 312. The output torque of the engine 210 is a torque that is actually exhibited by the engine 210 and is calculated based on the fuel injection amount. The upper limit torque of the engine 210 is the maximum torque that can be exhibited by the engine 210.

The required PTO torque determination unit 314 determines a required value (required PTO torque) of the torque distributed to the variable displacement pump 260 and the fixed displacement pump 270 from the PTO 220 based on the steering operation amount, the boom operation amount and the bucket operation amount acquired by the operation amount acquisition unit 311, and the measured values of the pump pressure of the variable displacement pump 260, the capacity of the variable displacement pump 260 and the pump pressure of the fixed displacement pump 270 acquired by the measured value acquisition unit 312. For example, the required PTO torque determination unit 314 obtains a required flow rate of the variable displacement pump 260 from the steering operation amount based on a PTO conversion function defining a relationship between an operation amount and a required flow rate. For example, the required PTO torque determination unit 314 obtains a required flow rate of the variable displacement pump 260 from the boom operation amount and the bucket operation amount based on the PTO conversion function. The required PTO torque determination unit 314 determines a required PTO torque based on the measured values of the pump pressure of the variable displacement pump 260, the capacity of the variable displacement pump 260, and the pump pressure of the fixed displacement pump 270, and the specified required flow rate of the variable displacement pump 260.

The required output torque determination unit 315 determines a torque required value (required output torque) of the output shaft of the transmission 230 based on the accelerator operation amount, the brake operation amount, the shift operation amount, and the FNR operation amount acquired by the operation amount acquisition unit 311, and the traveling speed calculated by the vehicle state calculation unit 313. For example, the required output torque determination unit 315 determines the required output torque from the traveling speed calculated by the vehicle state calculation unit 313 based on a traveling conversion function defining a relationship between a traveling speed and a required output torque. In this case, the required output torque determination unit 315 determines characteristics of the traveling conversion function based on the accelerator operation amount, the brake operation amount, the shift operation amount, and the FNR operation amount.

Specifically, the required output torque determination unit 315 specifies a traveling conversion function corresponding to a speed range specified by the shift operation amount among a plurality of traveling conversion functions respectively corresponding to a plurality of speed ranges. In a case where there is an accelerator operation, the required output torque determination unit 315 transforms the specified traveling conversion function based on the magnification related to the accelerator operation amount. In a case where there is a brake operation, the required output torque determination unit 315 transforms the specified traveling conversion function based on the magnification related to the brake operation amount. The required output torque determination unit 315 determines a sign of the required output torque based on the FNR operation amount. In a case where signs of the required output torque and the traveling speed do not match each other (a product of the required output torque and the traveling speed is negative), a torque of the braking side is exhibited by the transmission 230.

The traveling load estimation unit 316 estimates a traveling load torque $T_{load}$ related to travel based on the output torque $T_{eng}$ of the engine 210, the angular acceleration $\alpha_{eng}$ of the engine 210, the PTO torque $T_{PTO}$, the input-output speed ratio i of the transmission 230 and the angular acceleration $\alpha_{out}$ of the output shaft of the transmission 230 calculated by the vehicle state calculation unit 313.

The traveling load torque $T_{load}$ may be calculated based on the following Equation (1).

$$T_{load} = \frac{\eta_t}{i} N(T_{eng} - T_{PTO} - I_{eng}\alpha_{eng}) - \frac{I_v}{N}\alpha_{out} \quad (1)$$

(Equation 1)

$I_{eng}$ is an inertial moment of the engine 210. $I_v$ is an inertial moment of the work vehicle 100. $\eta_t$ is a torque efficiency of the transmission 230. N is an axle deceleration ratio between the output shaft of the transmission 230 and the front wheel portion 130 and between the output shaft of the transmission 230 and the rear wheel portion 140. The inertial moment $I_{eng}$, the inertial moment $I_v$, the torque efficiency $\eta_t$, and the axle deceleration ratio are constants.

Equation (1) may be derived from Equation (2) expressing a relationship between the output torque $T_{eng}$ of the engine 210 and the output torque $T_{out}$ of the transmission 230 and Equation (3) expressing a relationship between the output torque $T_{out}$ of the transmission 230 and the acceleration $\alpha_{out}$ of the work vehicle 100. In other embodiments, the traveling load torque $T_{load}$ may be calculated based on equations other than Equation (1). For example, an equation for specifying the traveling load torque $T_{load}$ may be derived by using an equation expressing a relationship among a pressure of the HST 231 measured by the HST pressure gauge 234, a capacity command for the variable displacement pump of the HST 231 or a pump capacity measured by the pump capacity meter provided in the variable displacement pump, and the output torque $T_{out}$ instead of Equation (2). In other embodiments, in a case where the transmission 230 includes an electric motor, an equation for specifying the traveling load torque $T_{load}$ may be derived by using an electric motor output torque estimated from a torque command, a voltage, or a current of the electric motor.

(Equation 2)

$$T_{out} = \frac{\eta_t}{i}(T_{eng} - T_{PTO} - I_{eng}\alpha_{eng}) \quad (2)$$

(Equation 3)

$$I_v \frac{1}{N}\alpha_{out} = NT_{out} - T_{load} \quad (3)$$

The work state specifying unit 317 specifies a work state of the work vehicle 100 based on the operation amounts acquired by the operation amount acquisition unit 311 and the measured values acquired by the measured value acquisition unit 312. Values of the work state take, for example, a "stop/low speed state", a "traveling state", an "excavation state", a "braking state", and an "emergency braking state".

The "stop/low speed state" is a state in which the work vehicle 100 stops without performing excavation work or is traveling at a low speed. For example, in a case where an absolute value of the traveling speed is smaller than a predetermined value, the work state specifying unit 317 may determine that the work state is the "stop/low speed state".

The "traveling state" is a state in which the work vehicle 100 is traveling forward or rearward. For example, in a case where the measured value of the pressure of the lift cylinder 124 is smaller than a predetermined value and the accelerator operation amount is more than 0, the work state specifying unit 317 may determine that the work state is the "traveling state".

The "excavation state" is a state in which the work equipment 120 is performing excavation work. For example, in a case where the measured value of the pressure of the lift cylinder 124 is equal to or greater than a predetermined value, the work state specifying unit 317 may determine that the work state is the "excavation state". The work state specifying unit 317 may determine whether or not the work state is the "excavation state" based on, for example, a posture of the work equipment 120. In this case, the measured value acquisition unit 312 acquires a measured value from a stroke sensor measuring a stroke of each cylinder (not illustrated) or an angle sensor measuring a rotation angle of the work equipment, and the work state specifying unit 317 determines whether or not the work state is the "excavation state" based on the measured value.

The "braking state" is a state in which the work vehicle 100 is performing braking. For example, in a case where the brake operation amount is more than 0, the work state specifying unit 317 may determine that the work state is the "braking state". For example, in a case where the FNR operation amount takes a value in an opposite direction to the current traveling direction, the work state specifying unit 317 may determine that the work state is the "braking state".

The "emergency braking state" is a state in which the work vehicle 100 is performing braking with a force stronger than in the "braking state". For example, in a case where the brake operation amount is more than a predetermined value, the work state specifying unit 317 may determine that the work state is the "emergency braking state".

The allowable range determination unit 318 determines an allowable output torque range for correcting the required output torque based on the work state specified by the work state specifying unit 317. Specifically, the allowable range determination unit 318 determines an allowable acceleration based on the work state specified by the work state specifying unit 317. The allowable range determination unit 318 adds an acceleration torque corresponding to the allowable acceleration to the traveling load torque to determine an upper limit value of the allowable output torque range, and subtracts the acceleration torque corresponding to the allowable acceleration from the traveling load torque to determine a lower limit value of the allowable output torque range.

The upper limit value $T_{max}$ of the allowable output torque range may be calculated based on the following Equation (4). The lower limit value $T_{min}$ of the allowable output torque range may be calculated based on the following Equation (5).

$$T_{max} = \frac{1}{N} T_{load} + I_v \frac{\alpha_{target} g}{N \cdot r_{tire}} \quad (4)$$

(Equation 4)

(Equation 5)

$$T_{min} = \frac{1}{N} T_{load} - I_v \frac{\alpha_{target} g}{N \cdot r_{tire}} \quad (5)$$

$\alpha_{target}$ is the allowable acceleration of the work vehicle. $r_{tire}$ is a radius of each of the front wheel portion 130 and the rear wheel portion 140. The allowable range determination unit 318 may determine the allowable output torque range by changing the acceleration $\alpha_{target}$ in accordance with the work state.

A description will be made of an example of a relationship between the work state and the allowable acceleration.

In a case where the work state is the "traveling state", the allowable range determination unit 318 sets the allowable acceleration to an acceleration (for example, 0.2 G) that does not impair the riding comfort of the operator. Consequently, in the "traveling state", an acceleration of the work vehicle 100 is included in an acceleration range that does not impair the riding comfort of the operator at all times.

In a case where the work state is the "excavation state", the allowable range determination unit 318 sets the allowable acceleration to a value less than the allowable acceleration related to the "traveling state". In the "excavation state", a load applied to the work equipment 120 is included in the traveling load torque estimated by the traveling load estimation unit 316. In other words, the traveling load torque in the "excavation state" has a value greater than in the "traveling state". Thus, it is possible to suppress unintended sudden acceleration, for example, when a load applied to the work equipment 120 is suddenly decreased, by restricting the allowable acceleration.

In a case where the work state is the "excavation state", and a tilt operation is performed, the allowable range determination unit 318 sets the allowable acceleration to a value less than the allowable acceleration related to the "excavation state" when the tilt operation is not performed. In a case where the tilt operation is performed in the "excavation state", there is a high probability that excavation may progress due to swing of the bucket 122 in a tilt direction and thus the traveling load torque may be suddenly reduced. Thus, it is possible to suppress sudden acceleration occurring during excavation by restricting the allowable acceleration.

In a case where the work state is the "stop/low speed state", the allowable range determination unit 318 sets the allowable acceleration to a value less than the allowable acceleration related to the "traveling state". Consequently, it is possible to suppress unintended sudden start.

In a case where the work state is the "braking state", the allowable range determination unit 318 sets the allowable acceleration to a value more than the allowable acceleration related to the "traveling state". There is a high probability that the operator may intend rapid braking in the "braking state". Thus, it is possible to perform immediate braking.

In a case where the work state is the "emergency braking state", the allowable range determination unit 318 sets the allowable acceleration to a value more than the allowable acceleration related to the "traveling state". In the "emergency braking state", a disc brake (not illustrated) is activated to perform braking, and thus the traveling load torque estimated by the traveling load estimation unit 316 includes a load due to the disc brake. Thus, the allowable range determination unit 318 sets the allowable acceleration to a great value such that the braking by the disc brake is not hindered by the allowable output torque range.

The required output torque correction unit 319 corrects the required output torque such that the required output torque is included in the allowable output torque range determined by the allowable range determination unit 318. In other words, in a case where the required output torque exceeds the upper limit value of the allowable output torque range, the required output torque correction unit 319 corrects the required output torque to the upper limit value of the allowable output torque range. In a case where the required output torque is less than the lower limit value of the allowable output torque range, the required output torque correction unit 319 corrects the required output torque to the lower limit value of the allowable output torque range.

The target rotation speed determination unit 320 determines a target engine rotation speed used to control the engine 210 based on required engine output that is a sum of required traveling power and required PTO output, required traveling power being calculated from the required output torque and the traveling speed, and required PTO output being calculated from the required PTO torque and the measured value of the rotation speed of the engine 210. The target rotation speed determination unit 320 determines the target engine rotation speed based on a rotation speed conversion function that is set in advance through design or the like and defines a relationship between required engine output and an engine rotation speed. The rotation speed conversion function may be designed to restrict rotation of the engine 210 to a low rotation side as much as possible in a range in which the required engine output can be exhibited and the engine acceleration is not hindered.

The target rotation speed determination unit 320 determines an engine rotation speed (PTO necessary rotation speed) that is necessary to achieve the required flow rate of the variable displacement pump 260 that is calculated by the required PTO torque determination unit 314. The target rotation speed determination unit 320 determines the PTO necessary rotation speed based on a rotation speed conversion function that is set in advance through design or the like, and that defines a relationship between a required flow rate of the variable displacement pump 260 and an engine rotation speed. In a case where the target engine rotation speed is lower than the PTO necessary rotation speed, the target rotation speed determination unit 320 determines the PTO necessary rotation speed as the target engine rotation speed.

The acceleration torque specifying unit 321 calculates a target acceleration torque necessary to rotate the engine 210 at the target engine rotation speed based on the measured value of the rotation speed of the engine 210 acquired by the measured value acquisition unit 312 and the target engine rotation speed determined by the target rotation speed determination unit 320. In other words, the acceleration torque specifying unit 321 determines a target engine acceleration based on a rotation speed corresponding to a difference between the measured value of the rotation speed of the engine 210 and the target engine rotation speed and calculates the target acceleration torque by multiplying the target engine acceleration by an inertial moment of the engine 210.

The target engine torque determination unit 322 determines a target engine torque that is a torque to be output from the engine 210 based on the PTO torque, the upper limit torque of the engine 210 and the input-output speed ratio of the transmission 230 calculated by the vehicle state calculation unit 313, the required output torque corrected by the required output torque correction unit 319, and the rotation speed of the engine 210 measured by the measured value acquisition unit 312. The target engine torque determination unit 322 calculates a required input torque that is a torque of the engine 210 necessary to obtain the required output torque by multiplying the required output torque by the input-output speed ratio of the transmission 230. The target engine torque determination unit 322 determines a smaller one of a sum of the PTO torque and the required input torque, and the upper limit torque of the engine 210, as the target engine torque.

The engine control unit 323 outputs an engine torque command to the fuel injection device 211. Specifically, the engine control unit 323 outputs the engine torque command indicating the target engine torque determined by the target engine torque determination unit 322. The engine control unit 323 is an example of a drive source control unit.

The target speed ratio determination unit 324 determines a target input-output speed ratio of the transmission 230 based on the measured value of the rotation speed of the input shaft of the transmission 230, the measured value of the rotation speed of the output shaft of the transmission 230, the traveling load torque estimated by the traveling load estimation unit 316, the required output torque corrected by the required output torque correction unit 319, and the target engine acceleration specified by the acceleration torque specifying unit 321. Specifically, the target speed ratio determination unit 324 estimates a rotation speed of the output shaft of the transmission 230 after a time related to a predetermined control cycle elapses based on the rotation speed of the output shaft of the transmission 230, the traveling load torque and the target output torque, and sets the estimated rotation speed as a target rotation speed of the output shaft. The target speed ratio determination unit 324 estimates a rotation speed of the input shaft of the transmission 230 after the time related to the predetermined control cycle elapses based on the rotation speed of the input shaft of the transmission 230 and the target engine acceleration, and sets the estimated rotation speed as a target rotation speed of the input shaft. The target speed ratio determination unit 324 determines the target input-output speed ratio by dividing the target rotation speed of the output shaft by the target rotation speed of the input shaft.

The transmission control unit 325 outputs a control command for the transmission 230 in order to achieve the target input-output speed ratio determined by the target speed ratio determination unit 324. In a case where the transmission 230 is an HST or an HMT, the transmission control unit 325 outputs, for example, capacity commands for a variable capacity motor and a variable displacement pump provided in the transmission 230.

The pump control unit 326 outputs a control command for the variable displacement pump 260 in order to achieve the required PTO torque determined by the required PTO torque determination unit 314.

(Control Method for Work Vehicle)

Figure 5:
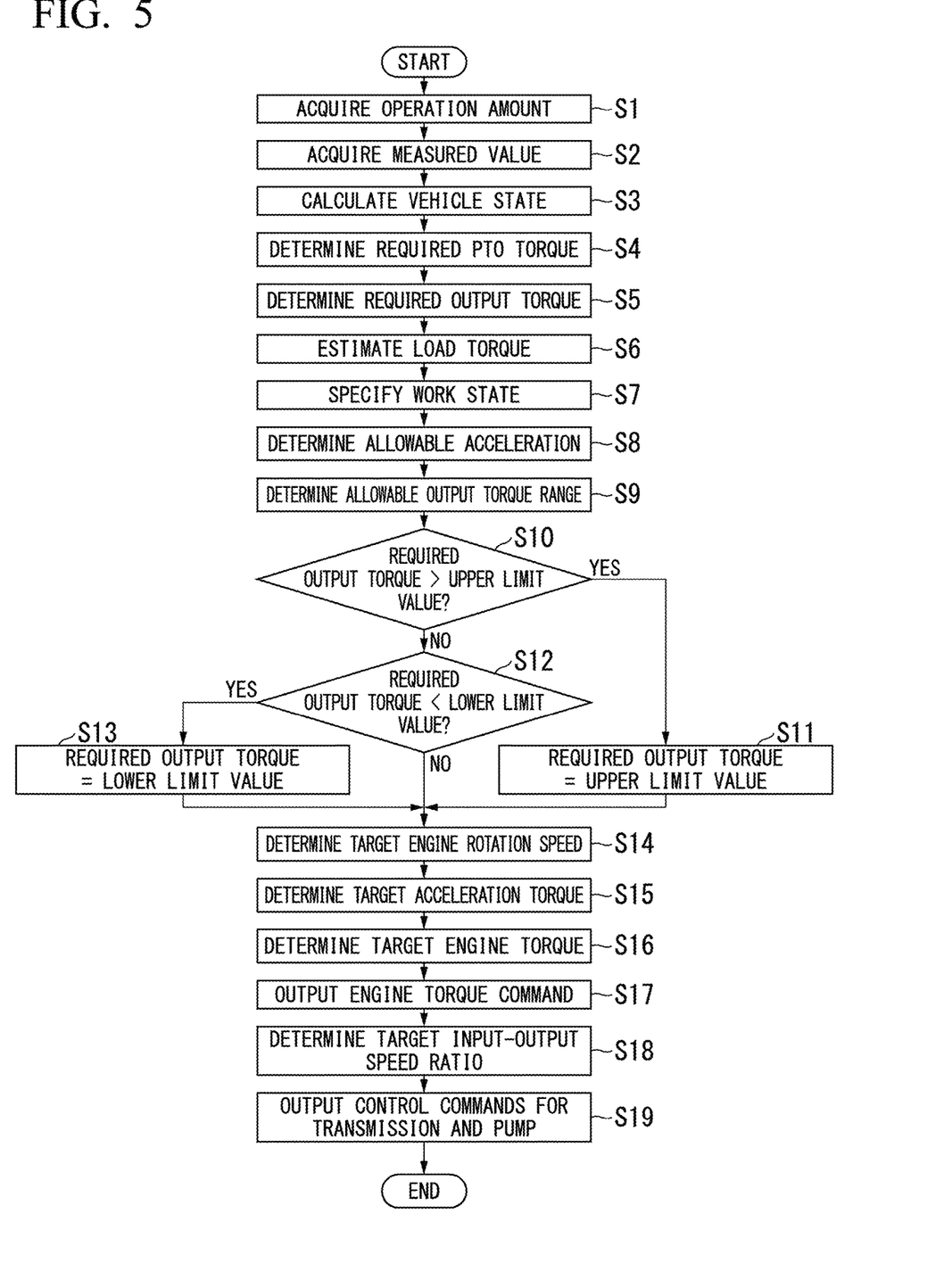
FIG. 5 is a flowchart illustrating a control method for the work vehicle according to the first embodiment.

FIG. 5 is a flowchart illustrating a control method for the work vehicle according to the first embodiment.

First, the operation amount acquisition unit 311 acquires an operation amount from each of the accelerator pedal 152, the brake pedal 153, the steering wheel 154, the front-rear switching switch 155, the shift switch 156, the boom lever 157, and the bucket lever 158 (step S1). The measured value acquisition unit 312 acquires measured values from the fuel injection device 211, the engine tachometer 212, the input shaft tachometer 232, the output shaft tachometer 233, the first pump pressure gauge 262, the pump capacity meter 263, the cylinder pressure gauge 264, and the second pump pressure gauge 271 (step S2).

Next, the vehicle state calculation unit 313 calculates an output torque of the engine 210, an upper limit torque of the engine 210, an angular acceleration of the engine 210, a PTO torque, an input-output speed ratio of the transmission 230, an angular acceleration of the output shaft of the transmission 230, and a traveling speed of the work vehicle 100 based on the measured values acquired in step S2 (step S3).

The required PTO torque determination unit 314 determines a required PTO torque based on the steering operation amount, the boom operation amount, and the block operation amount acquired in step S1, and the measured values of the pump pressure and the capacity of the variable displacement pump 260 and the pump pressure of the fixed displacement pump 270 acquired in step S2 (step S4). The required output torque determination unit 315 determines a required output torque based on the operation amount regarding traveling acquired in step S1 and the traveling speed calculated in step S3 (step S5). The traveling load estimation unit 316 estimates a traveling load torque based on the values of the vehicle state calculated in step S3 (step S6).

The work state specifying unit 317 specifies a work state of the work vehicle 100 based on the operation amounts acquired in step S1 and the measured values acquired in step S2 (step S7). In other words, the work state specifying unit 317 specifies whether the work state is a "stop/low speed state", a "traveling state", an "excavation state", a "braking state", or an "emergency braking state".

The allowable range determination unit 318 determines an allowable acceleration based on the work state specified by the work state specifying unit 317 (step S8). The allowable range determination unit 318 determines an allowable output torque range based on the traveling load torque estimated in step S6 and the allowable acceleration determined in step S8 (step S9).

The required output torque correction unit 319 determines whether or not the required output torque determined in step S5 exceeds an upper limit value of the allowable output torque range determined in step S9 (step S10). In a case where the required output torque exceeds the upper limit value of the allowable output torque range (step S10: YES), the required output torque correction unit 319 corrects the required output torque to the upper limit value of the allowable output torque range (step S11).

In a case where the required output torque does not exceed the upper limit value of the allowable output torque range (step S10: NO), the required output torque correction unit 319 determines whether or not the required output torque is less than a lower limit value of the allowable output torque range (step S12). In a case where the required output torque is less than the lower limit value of the allowable output torque range (step S12: YES), the required output torque correction unit 319 corrects the required output torque to the lower limit value of the allowable output torque range (step S13).

In a case where the required output torque is not less than the lower limit value of the allowable output torque range (step S12: NO), the required output torque correction unit 319 does not correct the required output torque.

The target rotation speed determination unit 320 determines a target engine rotation speed based on required engine output that is a sum of required traveling power that is calculated from the required output torque and the traveling speed, and required PTO output that is calculated from the required PTO torque and the measured value of the rotation speed of the engine 210 (step S14). The acceleration torque specifying unit 321 calculates a target acceleration torque based on the measured value of the rotation speed of the engine 210 and the target engine rotation speed determined in step S14 (step S15). The target engine torque determination unit 322 determines a target engine torque based on the required output torque; the PTO torque, the upper limit torque of the engine, and the input-output speed ratio of the transmission 230 calculated in step S3, and the measured value of the rotation speed of the engine 210 acquired in step S2 (step S16).

The engine control unit 323 outputs an engine torque command indicating the target engine torque determined in step S17 (step S17).

The target speed ratio determination unit 324 determines a target input-output speed ratio based on the measured value of the rotation speed of the input shaft of the transmission 230, the measured value of the rotation speed of the output shaft of the transmission 230, the traveling load torque, the target output torque, and the target engine acceleration (step S18). The transmission control unit 325 outputs a control command for the transmission 230 in order to achieve the target input-output speed ratio, and the pump control unit 326 outputs a control command for the variable displacement pump 260 in order to achieve the required PTO torque determined in step S4 (step S19).

The control device 300 executes the above-described control process every predetermined control cycle.

Advantageous Effects

As described above, in the control device 300 according to the first embodiment, the required output torque determined based on the operation amount and the traveling speed is corrected to be included in the allowable output torque range including the traveling load torque. Consequently, an acceleration of the work vehicle 100 is restricted to an acceleration corresponding to a torque related to a difference between the traveling load torque and the upper limit value or the lower limit value of the allowable output torque range. Therefore, the control device 300 can control traveling of the work vehicle such that an excessive acceleration is not generated.

The control device 300 according to the first embodiment determines an allowable acceleration range based on a work state of the work vehicle 100. Consequently, the control device 300 can restrict an acceleration in accordance with the work state. The control device 300 according to other embodiments may set the allowable acceleration range to a fixed range.

In the first embodiment, an allowable output torque range when the work state is the "excavation state" is narrower than an allowable output torque range when the work state is the "traveling state". In other words, an acceleration that is allowed when the work state is the "excavation state" is lower than an acceleration that is allowed when the work state is the "traveling state". Consequently, it is possible to suppress the occurrence of sudden start during excavation.

In the first embodiment, an allowable output torque range when the work state is the "excavation state" and a tilt operation is performed is narrower than an allowable output torque range when the work state is the "excavation state" and the tilt operation is not performed. Consequently, it is possible to suppress the occurrence of sudden start during excavation.

In the first embodiment, an allowable output torque range when the work state is the "braking state" is wider than an allowable output torque range when the work state is the "traveling state". In other words, an acceleration that is allowed when the work state is the "braking state" is higher than an acceleration that is allowed when the work state is the "traveling state". Consequently, it is possible to perform immediate braking of the work vehicle as intended by an operator. In other words, in the first embodiment, an acceleration that is allowed when the work state is the "emergency braking state" is higher than an acceleration that is allowed when the work state is the "traveling state". Consequently, in a case where braking by the disc brake is performed through the operator's operation, it is possible to prevent the braking by the disc brake from being hindered.

As described above, one embodiment has been described in detail with reference to the drawings, but a specific configuration is not limited to the above-described configuration, and various design changes or the like may occur.

For example, the work vehicle 100 according to the first embodiment uses the engine 210 as a drive source, but is not limited thereto. For example, the work vehicle 100 according to other embodiments may use a combination of a battery and an electric motor as a drive source. In this case, when an inertial moment of the electric motor is sufficiently small, a traveling load torque and a target output torque may be calculated regardless of an acceleration torque of the electric motor. In other embodiments, in a case where a combination of a battery and an electric motor is used as a drive source, the control device 300 may directly estimate an output shaft torque without using a torque of the drive source, a rotation speed ratio of a power transmission device, and a rotation speed of an output shaft.

The transmission 230 of the work vehicle 100 according to the first embodiment is a continuously variable transmission, but is not limited thereto. For example, the transmission 230 according to other embodiments may be a torque converter type transmission.

The work vehicle 100 according to the first embodiment is a wheel loader, but is not limited thereto. For example, the work vehicle 100 according to other embodiments may be the work vehicle 100 such as a bulldozer or a tractor. In this case, when the work vehicle 100 does not use a drive force distributed from the PTO 220 during traveling, a traveling load torque and a target output torque may be calculated regardless of a PTO torque.

According to at least one aspect among the aspects, the control device of the work vehicle can control traveling of the work vehicle such that an excessive acceleration is not generated.

The invention claimed is:

1. A control device for a work vehicle that includes
a drive source,
a traveling device that is driven by a drive force of the drive source,
a transmission having an input shaft and an output shaft, the input shaft being connected to the drive source and the output shaft being connected to the traveling device, the transmission transmitting the drive force from the input shaft to the output shaft,
an operation device configured to be operated to set a magnitude of the drive force in accordance with an operation amount of the operation device, and
a work equipment used to excavate a work target object, the control device comprising a processor, the processor being configured to
determine a required output torque of the transmission based on the operation amount of the operation device and a traveling speed of the work vehicle,
estimate a traveling load torque acting on the work vehicle based on a torque of the drive source, a rotation speed ratio between the input shaft and the output shaft of the transmission, and a rotation speed of the output shaft,
specify a work state of the work vehicle,
determine an allowable acceleration of the work vehicle based on the work state,
calculate an upper limit value and a lower limit value based on the traveling load torque and the allowable acceleration,
determine an allowable output torque range to be a range of output torque values between the upper limit value and the lower limit value, the upper limit value and the lower limit value being calculated such that the allowable output torque range is narrower when the work state is an excavation state using the work equipment than when the work state is a traveling state,
correct the required output torque to a corrected required output torque that is included in the allowable output torque range, and
output a control signal to control the drive source based on the corrected required output torque.

2. The control device of the work vehicle according to claim 1, wherein
in a case in which the work state is the excavation state using the work equipment and a tilt operation is performed on the work equipment, the processor is configured to determine the allowable acceleration such that the allowable output torque range is narrower than an allowable output torque range when the work state is the excavation state and the tilt operation is not performed.

3. The control device of the work vehicle according to claim 1, wherein
in a case in which the work state is a braking state, the processor is configured to determine the allowable acceleration such that the allowable output torque range is wider than an allowable output torque range when the work state is a traveling state.

4. The work vehicle as recited in claim 1 and including the control device according to claim 1, wherein
the transmission is configured to change the rotation speed ratio; and
the operation device.

5. The work vehicle according to claim 4, wherein
the drive source includes an engine,
the traveling device includes a front axle and a rear axle, and
the operation device includes at least one of an accelerator pedal, a brake pedal, a steering wheel, a front-rear switching switch, a shift switch, a boom lever, and a bucket lever.

6. The control device of the work vehicle according to claim 1, wherein
the processor is further configured to
calculate an acceleration torque based on the allowable acceleration,
calculate the upper limit value by adding the acceleration torque to the traveling load torque, and
calculate the lower limit value by subtracting the acceleration torque from the traveling load torque.

7. The control device of the work vehicle according to claim 6, wherein
the processor is further configured to
set the allowable acceleration in accordance with the work state of the work vehicle such that the acceleration torque is smaller when the work state is the excavation state than when the work state is the traveling state.

8. The control device of the work vehicle according to claim 6, wherein
the processor is further configured to
set the allowable acceleration in accordance with the work state of the work vehicle such that the acceleration torque is smaller when the work state is the excavation state and a tilt operation of a work equipment is performed than when the work state is the excavation state the tilt operation is not performed.

9. The control device of the work vehicle according to claim 6, wherein
the processor is further configured to
set the allowable acceleration in accordance with the work state of the work vehicle such that the acceleration torque is larger when the work state is a braking state than when the work state is the traveling state.

10. A control method for a work vehicle, the work vehicle including
a drive source,
a traveling device that is driven by a drive force of the drive source,
a transmission having an input shaft and an output shaft, the input shaft being connected to the drive source and the output shaft being connected to the traveling device, the transmission being configured to change a rotation speed ratio between the input shaft and the output shaft,
an operation device configured to be operated to set a magnitude of the drive force in accordance with an operation amount of the operation device, and
a work equipment used to excavate a work target object,
the control method comprising using a computer including a processor to:
determine a required output torque of the transmission based on an operation amount of the operation device and a traveling speed of the work vehicle;
estimate a traveling load torque acting on the work vehicle based on a torque of the drive source, a rotation speed ratio between the input shaft and the output shaft of the transmission, and a rotation speed of the output shaft;
specify a work state of the work vehicle;
determine an allowable acceleration of the work vehicle based on the work state;
calculate an upper limit value and a lower limit value based on the traveling load torque and the allowable acceleration,
determine an allowable output torque range to be a range of output torque values between the upper limit value and the lower limit value, the upper limit value and the lower limit value being calculated such that the allowable output torque range is narrower when the work state is an excavation state using the work equipment than when the work state is a traveling state;
correct the required output torque to a corrected required output torque that is included in the allowable output torque range; and
output a control signal to control the drive source based on a corrected required output torque.

\* \* \* \* \*